United States Patent Office 3,769,355
Patented Oct. 30, 1973

3,769,355
PREPARATION OF NITROCYCLOPROPANE FROM 3-CHLORO-1-NITROPROPANE
John D. Bacha and Charles M. Selwitz, Borough of Monroeville, Pa., assignors to Gulf Research & Development Company, Pittsburgh, Pa.
No Drawing. Filed Feb. 5, 1973, Ser. No. 329,566
Int. Cl. C07c 79/08
U.S. Cl. 260—644                          13 Claims

ABSTRACT OF THE DISCLOSURE

Nitrocyclopropane is prepared by reacting 3-chloro-1-nitropropane with a base in the presence of a polar, aprotic solvent. For example, the reaction of 3-chloro-1-nitropropane with potassium carbonate in the presence of dimethyl sulfoxide produces nitrocyclopropane in high yield.

---

This invention relates to a method of making nitrocyclopropane. More particularly this invention relates to a method of making nitrocyclopropane in good yield by the reaction of 3-chloro-1-nitropropane with a base in the presence of a polar, aprotic solvent.

Nitrocyclopropane has been made in low yield by the direct nitration of cyclopropane. Nitrocyclopropane has also been made as described in U.S. Pats. Nos. 3,100,805 and 3,100,806 by the ring closure of 3-iodo-1-nitropropane. In the procedures described in these patents, initially prepared 3-chloro-1-nitropropane must be converted to 3-iodo-1-nitropropane using an excess of sodium iodide. These patents state that 3-chloro-1-nitropropane submits to ring closure only with 10 percent yield under the best conditions.

We have unexpectedly discovered that 3-chloro-1-nitropropane can be converted to nitrocyclopropane in a single step at a high yield of nitrocyclopropane, greater than 60 percent in many instances, without requiring the interposition of costly and yield reducing iodination and associated purification steps.

Our invention is based on the discovery that 3-chloro-1-nitropropane can be reacted with a suitable base in the presence of a polar, aprotic solvent to effect ring closure at a high yield of nitrocyclopropane. The use of the polar, aprotic solvent is of critical significance in obtaining the high yields of our invention.

Useful polar, aprotic solvents include the sulfoxides, the sulfones, the di-N-substituted carboxylic acid amides, the N-substituted pyrrolidones, and the like. The sulfoxides are defined by the formula $R_1(R_2)S:O$ in which $R_1$ and $R_2$ are independently selected from lower alkyl, phenyl and benzyl and chlorine substituted derivatives thereof. Dimethyl sulfoxide is the preferred sulfoxide. Also useful are diethyl sulfoxide, di-n-propyl sulfoxide, di-n-butyl sulfoxide, di-2-chloroethyl sulfoxide, diphenyl sulfoxide, methyl phenyl sulfoxide, benzyl phenyl sulfoxide, dibenzyl sulfoxide, and the like. The sulfones are defined by the formula $R_3(R_4)SO_2$ in which $R_3$ and $R_4$ are independently selected from lower alkyl and can be joined together to form a cyclic compound having from three to eight members in the ring. Sulfolane also known as tetramethylene sulfone is the preferred sulfone. Also useful are dimethyl sulfone, diethyl sulfone, trimethylene sulfone, pentamethylene sulfone, hexamethylene sulfone, and the like.

The di-N-substituted carboxylic acid amides are defined by the formula $R_5CONR_6(R_7)$ in which $R_5$ is hydrogen or lower alkyl and $R_6$ and $R_7$ are independently lower alkyl. Preferred di-N-substituted carboxylic acid amides are dimethyl formamide and dimethyl acetamide. Also useful are diethyl formamide, diethyl acetamide, di-n-propyl acetamide, di-t-butyl acetamide, dimethyl butyramide, dimethyl propionamide, and the like. The useful N-substituted pyrrolidones include the N-lower alkyl alpha and beta pyrrolidones. Preferred are N-methyl pyrrolidone and N-ethyl pyrrolidone. Other polar, aprotic solvents are useful herein such as hexamethylenephosphoramide and the like. As used herein, lower alkyl includes alkyl groups having from one to about four carbon atoms. Suitable mixtures of two or more polar, aprotic solvents can also be used.

Any alkali metal or magnesium carbonate, bicarbonate, hydroxide, lower alkoxide, fluoride, or lower alkyl carboxylate; or calcium, barium or strontium oxide or hydroxide; or ammonium carbonate, hydroxide, fluoride or lower alkyl carboxylate; or a mixture thereof can be used as the base for reaction with the 3-chloro-1-nitropropane. We prefer potassium carbonate and sodium carbonate. Although the specified fluorides are not generally considered to be bases, they possess useful basic properties when dissolved in the polar, aprotic solvent and are therefore defined as bases herein. Although we mean to include lithium, sodium, potassium, rubidium and cesium as alkali metals herein, we prefer the first three members of the group and particularly potassium and sodium due to availability and moderate cost. The alkoxides have from one to about four carbon atoms and include the methoxide, ethoxide, propoxide, t-butoxide, and the like. The lower alkyl carboxylates have up to about four carbon atoms and include acetate, propionate, isobutyrate, and the like.

Also useful as the base for reaction with the 3-chloro-1-nitropropane is a primary, secondary or tertiary alkyl or cycloalkyl amine in which each alkyl group independently has from one to about eight carbon atoms and each cycloalkyl group contains from five to six carbon atoms. Useful amines include monomethylamine, dimethylamine, trimethylamine, triethylamine, isopropylamine, n-butylamine, cyclohexylamine, n-octylamine, and the like.

The reaction of the base with the 3-chloro-1-nitropropane is a liquid phase reaction carried out in the polar, aprotic solvent. This requires that the base and the solvent be suitably selected to insure that the base which is used is sufficiently soluble in the desired polar, aprotic solvent to effect reaction at a suitable rate.

The temperature for carrying out the reaction is not critical. At too low a temperature the reaction occurs at an impractical rate, while at too high a temperature undesired decomposition becomes important. Since the reaction rate increases as the temperature increases, an elevated temperature can in many instances be advantageously employed. Also, an elevated temperature may be preferred with certain combinations of base and polar, aprotic solvent to increase the solubility of the base in the solvent. In view of this, we find that a broad temperature range of about 0° to about 160° C. is useful. However, we prefer a temperature within the range of about 15° to about 145° C. and most prefer a temperature within the range of about 25° to about 125° C. The reaction can be carried out at atmospheric pressure or at lower or higher pressures. We prefer to use atmospheric pressure or pressures lower than atmospheric. At pressures lower than atmospheric, a semi-continuous mode of operation can be employed, that is, the product is removed as it is formed.

The relative proportion of the 3-chloro-1-nitropropane, the base and the polar, aprotic solvent that is used is not critical to obtaining reaction. However, we have found that the reaction can be run at greater efficiency when the amount of these materials is controlled within specified ranges. Thus, we have found that a molar ratio of the base to the 3-chloro-1-nitropropane of about 0.5:1 to about 4:1 is desirable with a ratio of about 1:1 to about 2.5:1 being preferred. In like manner we have found that a volume ratio of polar, aprotic solvent to 3-chloro-1-nitropropane of about 1:1 to about 100:1 is desirable with a volume ratio of about 5:1 to about 50:1 being preferred. Also we have found that a ratio of polar, aprotic solvent in liters to base in mols of about 0.5:1 to about 10:1 is desirable with about 1:1 to about 5:1 being preferred.

The reaction of the 3-chloro-1-nitropropane and the base in the polar, aprotic solvent can be conveniently carried out in a batch operation particularly when large quantities are not required. When conducted batchwise, it is preferred to carry out the reaction until substantially no 3-chloro-1-nitropropane is left in the reactor to avoid a 49.6 mol percent overall yield of nitrocyclopropane. Similar experiments resulted in the same pattern, that is, an increase in the conversion and yield the greater the time but with a decrease in the efficiency of the reaction.

EXAMPLES 3-9

A series of experiments were conducted in the manner described in Example 1 using the conditions set out in Table I. The temperature was 26° C. in each instance. Table I shows the results of Examples 1–9 which indicate

TABLE I

| | | | | | | | Nitrocyclopropane | | |
|---|---|---|---|---|---|---|---|---|---|
| Example | Solvent | Ml. | $K_2CO_3$, mmol | CNP, mmol | Time, hours | Conv., percent | Yield, percent | Efficiency, percent |
| 1 | DMSO | 30 | 6.5 | 6.5 | 2 | >99 | 55.9 | 55.9 |
| 2 | DMF | 30 | 6.5 | 6.5 | 20 | 100 | 49.6 | 49.6 |
| 3 | DMAC | 30 | 7.2 | 6.5 | 3 | 95.6 | 56.5 | 59.0 |
| 4 | Sulfolane | 30 | 6.5 | 6.5 | 20 | 78.2 | 35.6 | 45.5 |
| 5 | DMSO:t-BuOH | 30 | 7.2 | 6.5 | 2 | >99 | 46.4 | 46.4 |
| 6 | DMSO:$H_2O$ | 30 | 6.5 | 6.5 | 2 | 100 | 44.8 | 44.8 |
| 7 | DMSO:benzene | 35 | 12.0 | 8.0 | 4 | 100 | 45.8 | 45.8 |
| 8 | DMSO:THF | 35 | 12.0 | 8.0 | 3 | 100 | 45.3 | 45.3 |
| 9 | DMF:toluene | 30 | 7.2 | 6.5 | 23 | 75 | 34.8 | 46.4 | any need for reactant recovery and recycle steps. The reaction can also be carried out as a continuous reaction by introducing the reactants and the polar, aprotic solvent into an elongated reactor and maintaining the reaction temperature as the reaction mixture progresses to the outlet. In this continuous procedure the reaction can be carried out at partial conversion with somewhat improved efficiency and with recycle of unreacted 3-chloro-1-nitropropane. In the reaction, whether carried out as a batch or as a continuous reaction, some of the 3-chloro-1-nitropropane is converted to an unidentified by-product.

The following examples are set out to illustrate the novel process of the invention and to provide a better understanding of its details and advantages.

EXAMPLE 1

A 50 ml. flask was charged with 30 ml. of dimethyl sulfoxide, 0.9 gram (6.5 mmols) of powdered potassium carbonate and 0.8 gram (6.5 mmols) of 3-chloro-1-nitropropane at room temperature (26° C.). The mixture was stirred for two hours. Analysis revealed that there was greater than 99 mol percent conversion of the 3-chloro-1-nitropropane at a yield of 55.9 mol percent nitrocyclopropane.

EXAMPLE 2

The 50 ml. flask was charged with 30 ml. of dimethyl formamide, 0.9 gram of powdered potassium carbonate and 0.8 gram of 3-chloro-1-nitropropane at 26° C. and stirred for three hours. Analysis showed that 48.6 percent of the 3-chloro-1-nitropropane had been converted yielding 29.5 mol percent nitrocyclopropane at an efficiency (selectivity) of 60.6 mol percent. The contents of the flask were heated to 55° C. for another hour and analysis disclosed a total conversion of the 3-chloro-1-nitropropane of 91.5 percent and a yield of 48.2 mol percent of nitrocyclopropane at an efficiency of 52.7 mol percent. The contents of the reactor were allowed to cool to 26° C. and were maintained at this temperature for an additional 16 hours. The final analysis showed that there had been 100 percent conversion of the 3-chloro-1-nitropropane at the effects of variations in the polar, aprotic solvent and the effects of various diluents of the solvent in converting 3-chloro-1-nitropropane (CNP) to nitrocyclopropane. Dimethyl sulfoxide (DMSO), dimethyl formamide (DMF), dimethyl acetamide (DMAC) and sulfolane were used as the solvent and t-butyl alcohol (t-BuOH), water, benzene, toluene, and tetrahydrofuran (THF) served as the diluent. Five volume percent water in the solvent, 20 volume percent t-butyl alcohol and 50 volume percent of the remaining diluents were used in the solvent.

EXAMPLE 10

A 100 ml. flask was charged with 70 ml. of pyridine and 16.0 mmols of 3-chloro-1-nitropropane and stirred at 29° C. for 2.3 hours and then stirred at about 75–100° C. for 0.6 hour. Analysis of the product mixture disclosed that about 10 percent of the 3-chloro-1-nitropropane had been converted without producing any nitrocyclopropane.

EXAMPLE 11

A 50 ml. flask was charged with 30 ml. of methanol, 6.5 mmols of powdered potassium carbonate and 6.5 mmols of 3-chloro-1-nitropropane and stirred at 28° C. for 2.3 hours and refluxed at about 65° C. for about two hours. An analysis of the resulting product revealed that there was 100 percent conversion of the 3-chloro-1-nitropropane at a yield of less than three percent nitrocyclopropane.

EXAMPLE 12-18

A number of experiments were carried out in the manner described in Example 1 using dimethyl sulfoxide and different bases with 3-chloro-1-nitropropane as set forth in Table II. Example 16 was carried out at 80° C. and the remainder were carried out at 26° C. In a number of these experiments intermediate analyses were made. Thus, in Example 12 after two hours there was 55 percent conversion and 33.6 percent yield, in Example 17 after two hours there was 78.4 percent conversion and 42.7 percent yield, and in Example 18 there was 84.8 percent conversion and 34.3 percent yield after one hour.

TABLE II

| | | | | | | | Nitrocyclopropane | | |
|---|---|---|---|---|---|---|---|---|---|
| Example | DMSO, ml. | Base | | Mmol | CNP, mmol | Time, hours | Conv., percent | Yield, percent | Efficiency, percent |
| 12 | 30 | $KHCO_3$ | | 13.0 | 6.5 | 22 | 100 | 54.2 | 54.2 |
| 13 | 30 | $NaHCO_3$ | | 13.1 | 6.5 | 22 | 93.6 | 48.6 | 52.0 |
| 14 | 30 | $Li_2CO_3$ | | 8.1 | 6.5 | 51 | 56.5 | 30.4 | 53.7 |
| 15 | 30 | $(NH_4)_2CO_3$ | | 8.5 | 6.5 | 23 | 99.0 | 50.8 | 51.4 |
| 16 | 70 | $MgCO_3$ | | 25.0 | 16.0 | 5.8 | 80.1 | 37.6 | 46.9 |
| 17 | 30 | NaOAc | | 13.0 | 6.5 | 22.0 | 100 | 45.7 | 45.7 |
| 18 | 30 | NaOMe | | a 10.2 | 6.5 | 3.0 | >99 | 40.3 | 40.3 | a 2.8 mmols of this amount were added for the last hour.

EXAMPLE 19

A 50 ml. flask was charged with 35 ml. of dimethyl sulfoxide, 6.8 mmols of triethylamine and 8.0 mmols of 3-chloro-1-nitropropane and stirred at 26° C. After five hours, the conversion was 60.6 percent at a yield of nitrocyclopropane of 27.9 percent and an efficiency of 46 percent. After 24 hours, the overall conversion was 87.9 percent at a yield of 37.9 percent nitrocyclopropane. After 30 hours, the overall conversion had increased to 93.3 percent at a total yield of nitrocyclopropane of 40.6 percent.

EXAMPLE 20

A 50 ml. flask was charged with 30 ml. of dimethyl formamide, 6.8 mmols of n-butylamine and 6.5 mmols of 3-chloro-1-nitropropane. After stirring at 26° C. for 3.3 hours, the conversion was 36.5 at a yield of 17.8 percent nitrocyclopropane. The temperature was then raised to 55° C. and the overall conversion after one hour was 50.9 percent at a yield of 22.6 percent nitrocyclopropane. The temperature was reduced to 26° C. and reaction was continued for a cumulative total of 25 hours resulting in a final overall conversion of 61.2 percent and yield of 24.5 nitrocyclopropane.

EXAMPLE 21

A 100 ml. flask was charged with 70 ml. of dimethyl sulfoxide, 32 mmols of potassium fluoride and 16 mmols of 3-chloro-1-nitropropane. After stirring for 2.6 hours at 27° C. the conversion was 38.6 percent at a yield of 22.9 percent nitrocyclopropane and after a total of 23.2 hours the conversion was 97.4 percent at a yield of nitrocyclopropane of 47.1 percent.

Several experiments were carried out at a temperature substantially higher than room temperature.

EXAMPLE 22

Seventy ml. of dimethyl sulfoxide and 24 mmols of lithium carbonate were added to a 100 ml. flask at room temperature and heated to 100 °C. with stirring. Sixteen mmols of 3-chloro-1-nitropropane were slowly dropped over a period of about 30 minutes into this heated solution to prevent overheating due to the mild exothermicity of the reaction. After two hours at 100° C., analysis of the mixture disclosed 100 percent conversion at a yield of 52 percent of nitrocyclopropane.

EXAMPLES 25–30

A series of experiments were carried out to compare variations in reaction temperature and charge ratios. The results are set forth in Table III in which all reactions were carried out as described in Example 22. In each experiment 70 ml. of dimethyl sulfoxide and 16 mmols of 3-chloro-1-nitropropane were used except in Example 28 which used 32 mmols of 3-chloro-1-nitropropane. The yield of nitrocyclopropane in each case is based on 100 percent conversion.

TABLE III

| Example | $K_2CO_3$, mmol | Temp., °C. | Time, hours | Yield, percent |
|---|---|---|---|---|
| 25 | 32 | 15 | 4.1 | 49.0 |
| 26 | 32 | 27–32 | 2.3 | 55.0 |
| 27 | 24 | 55 | 2.2 | 56.1 |
| 28 | 32 | 58 | 2.0 | 55.6 |
| 29 | 24 | 110 | 1.8 | 62.2 |
| 30 | 24 | 143 | 1.0 | 59.9 |

EXAMPLES 31–35

In these experiments 87 percent of the dimethyl sulfoxide and the base in powder form were mixed in a one liter flask at room temperature and heated to reaction temperature with stirring. A solution of 3-chloro-1-nitropropane (CNP) and the remaining dimethyl sulfoxide were slowly added to the flask. Reaction was substantially instantaneous with 100 percent conversion of the 3-chloro-1-nitropropane in all experiments. The results of these experiments are set out in Table IV.

EXAMPLES 36–37

Two experiments were carried out in a semicontinuous manner using a one liter sealed flask with magnetic stirrer. The flask was maintained at a constant elevated temperature and at 84 mm. Hg absolute. The base in powder form and 87 percent of the dimethyl sulfoxide solvent were added to the flask at room temperature. Vacuum was drawn on the flask and the contents were stirred and heated to reaction temperature. The 3-chloro-1-nitropropane in solution with the remaining solvent was slowly added to the flask. Reaction was instantaneous with 100 percent conversion. Since the flask was being operated above the boiling point of the product nitrocyclopropane (NCP), this product was volatilized and substantially removed from the reaction site. The results of these experiments are set out in Table IV.

TABLE IV

| Example | DMSO, ml. | Base | Mmol | CNP, mmol | Reaction temp., °C. | Addition time, min. | Conv., percent | NCP yield, percent |
|---|---|---|---|---|---|---|---|---|
| 31 | 600 | $Na_2CO_3$ | 400 | 300 | 113 | 135 | 100 | 51.7 |
| 32 | 300 | $K_2CO_3$ | 102.8 | 68.5 | 110 | 50 | 100 | 61.0 |
| 33 | 300 | $K_2CO_3$ | 400 | 300 | 114 | 90 | 100 | 52.5 |
| 34 | 300 | $K_2CO_3$ | 200 | 150 | 116 | 40 | 100 | 56.1 |
| 35 | 300 | $Na_2CO_3$ | 200 | 150 | 116 | 35 | 100 | 53.8 |
| 36 | 625 | $K_2CO_3$ | 400 | 300 | 116 | 210 | 100 | 62.2 |
| 37 | 625 | $Na_2CO_3$ | 400 | 300 | 117 | 175 | 100 | 57.6 |

EXAMPLE 23

A mixture of 70 ml. of dimethyl sulfoxide and 48 mmols potassium fluoride was made in a 100 ml. flask by adding the compounds at room temperature and heating with stirring to 105° C. The temperature was maintained at 105° C. and 16.0 mmols of 3-chloro-1-nitropropane were added dropwise over a period of about 30 minutes. After two hours, the product mixture analyzed 53.3 percent nitrocyclopropane at 100 percent conversion of the 3-chloro-1-nitropropane.

EXAMPLE 24

Experiment 23 was repeated using 70 ml. of sulfolane and a temperature of 146° C. The product analysis after four hours of reaction time showed a 79.7 percent conversion and a yield of 33.6 percent nitrocyclopropane.

Nitrocyclopropane is produced in like manner when 3-chloro-1-nitropropane is reacted with calcium hydroxide in the presence of N-methyl pyrrolidone, when 3-chloro-1-nitropropane is reacted with cyclohexylamine in the presence of methyl phenyl sulfoxide, when 3-chloro-1-nitropropane and potassium hydroxide are reacted in the presence of hexamethylenephosphoramide, and the like.

It is to be understood that the above disclosure is by way of specific example and that numerous modifications and variations are available to those of ordinary skill in the art without departing from the true spirit and scope of our invention.

We claim:
1. A method for preparing nitrocyclopropane which comprises reacting 3-chloro-1-nitropropane with a base selected from alkali metal or magnesium carbonate, bicarbonate, hydroxide, lower alkoxide, fluoride, or lower alkyl carboxylate; or calcium, barium or strontium oxide or hydroxide; or ammonium carbonate, hydroxide, fluoride or lower alkyl carboxylate; or primary, secondary or tertiary alkyl or cycloalkyl amine in which each alkyl group has from one to about eight carbon atoms and each cycloalkyl group contains from five to six carbon atoms in a polar, aprotic solvent at a temperature between about 0° and 160° C.

2. A method in accordance with claim 1 in which the polar, aprotic solvent is a sulfoxide defined by the formula $R_1(R_2)S:O$ in which $R_1$ and $R_2$ are independently lower alkyl, phenyl or benzyl, or a chlorine substituted derivative thereof; a sulfone defined by the formula $R_3(R_4)SO_2$ in which $R_3$ and $R_4$ are independently selected from lower alkyl and can be joined together in a cyclic compound having from three to eight members in the ring; a di-N-substituted carboxylic acid amide defined by the formula $R_5CONR_6(R_7)$ in which $R_5$ is H or lower alkyl and $R_6$ and $R_7$ are independently lower alkyl; an N-lower alkyl alpha or beta pyrrolidone; hexamethylenephosphoramide or a mixture thereof.

3. A method for preparing nitrocyclopropane in accordance with claim 1 in which the polar, aprotic solvent is dimethyl sulfoxide, dimethylformamide, dimethylacetamide or sulfolane.

4. A method in accordance with claim 1 in which the volume ratio of the polar, aprotic solvent to the 3-chloro-1-nitropropane is between about 1:1 and about 100:1.

5. A method in accordance with claim 4 in which the volume ratio of the polar, aprotic solvent to the 3-chloro-1-nitropropane is between about 5:1 and about 50:1.

6. A method in accordance with claim 1 in which the ratio of the polar, aprotic solvent in liters to the base in mols is between about 0.5:1 and about 10:1.

7. A method in accordance with claim 6 in which the ratio of the polar, aprotic solvent in liters to the base in mols is between about 1:1 and about 5:1.

8. A method in accordance with claim 1 in which the molar ratio of the base to the 3-chloro-1-nitropropane is between about 0.5:1 and about 4:1.

9. A method in accordance with claim 8 in which the molar ratio of the base to the 3-chloro-1-nitropropane is between about 1:1 and about 2.5:1.

10. A method in accordance with claim 1 in which the temperature is between about 15° and about 145° C.

11. A method in accordance with claim 1 in which the temperature is between about 25° and about 125° C.

12. A method for preparing nitrocyclopropane which comprises reacting 3-chloro-1-nitropropane with sodium carbonate or potassium carbonate in a solvent selected from dimethyl sulfoxide, dimethylformamide, dimethylacetamide or sulfolane at a temperature between about 0° and about 160° C.

13. A method in accordance with claim 12 in which the solvent is dimethyl sulfoxide and the temperature is between about 15° and about 145° C.

References Cited
UNITED STATES PATENTS

| | | | |
|---|---|---|---|
| 3,100,805 | 8/1963 | Bay | 260—644 |
| 3,100,806 | 8/1963 | Bay | 260—644 |

OTHER REFERENCES

Rodd's Chemistry of Carbon Compounds, S. Coffey, editor, 2nd ed., vol. II, part A, Elsevier Pub. Co., London, 1964, p. 45.

LELAND A. SEBASTIAN, Primary Examiner